United States Patent [19]

Mason

[11] 3,973,346
[45] Aug. 10, 1976

[54] FISHING POLE HOLDER
[76] Inventor: Les Mason, 4028 Ridge Drive, Pueblo, Colo. 81008
[22] Filed: Nov. 7, 1974
[21] Appl. No.: 521,579

[52] U.S. Cl. .............................................. 43/15
[51] Int. Cl.² ..................................... A01K 97/12
[58] Field of Search ...................... 43/15, 16, 21.2

[56] References Cited
UNITED STATES PATENTS

| | | | |
|---|---|---|---|
| 2,703,465 | 3/1955 | Stefano | 43/15 |
| 2,784,516 | 3/1957 | Barnes et al. | 43/16 |
| 2,804,277 | 8/1957 | Kinder | 43/16 |
| 3,837,109 | 9/1974 | DeJulio | 43/15 |

Primary Examiner—Louis G. Mancene
Assistant Examiner—Peter K. Skiff
Attorney, Agent, or Firm—Burton, Crandell & Polumbus

[57] ABSTRACT

A fishing pole holder for supporting a fishing pole then for lifting the pole in response to a pull on the fishing line is formed by a swingable handle engaging socket mounted upon a ground or other support and biased to a vertically upright position by a coil spring. The pole handle socket is latched in a generally horizontal position by a line releasable latch mechanism. Upon a pull on the fishing line in response to a bite by a fish on the bait, the latch is released and the pole swung upwardly to tension the line and set the hook. In the upright position, the pole is held with the line under tension to prevent escape of the fish.

1 Claim, 7 Drawing Figures

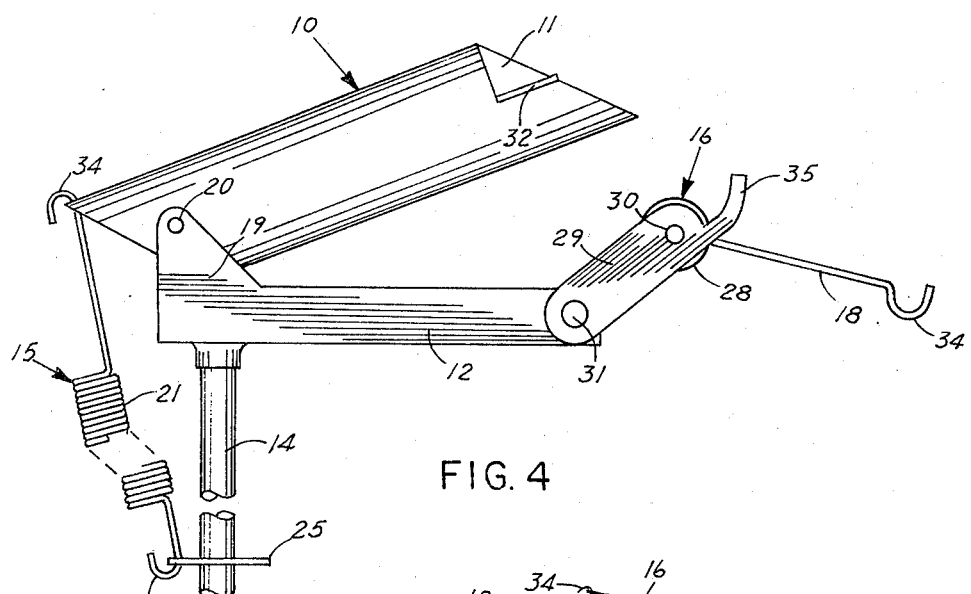
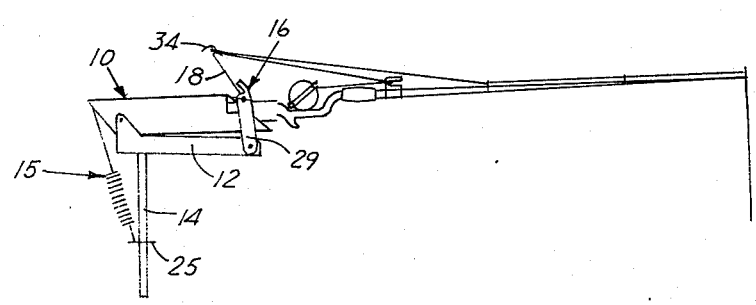
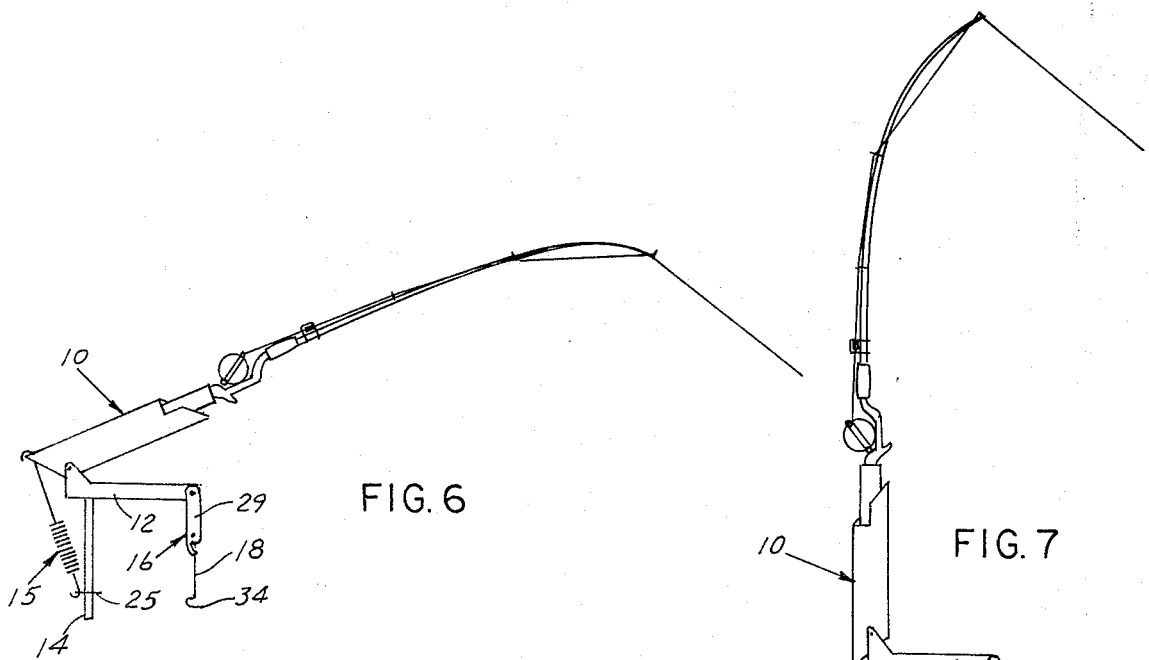

3,973,346

FISHING POLE HOLDER

The present invention relates to a fishing pole holder and more particularly to an apparatus for holding a fishing pole and for automatically lifting the pole to set the fishhook in response to a pull on the hook and line.

The principal object of the present invention is to provide an apparatus for holding a fishing pole while ice fishing or bait fishing from the shore of a lake or stream and for automatically setting the hook and keeping a steady tension on the fishing line in response to a tug on the hook end line.

A further object of the present invention is to provide an apparatus of the foregoing character in which the lifting force on the pole can be adjusted to accommodate both light and heavy fishing equipment.

A further object of the invention is to provide an apparatus of the foregoing character in which the pole lifting mechanism is actuated in response to a slight tug on the line indicative of a fish taking the bait in order to insure prompt effective strikes.

Other objects and advantages of the present invention will become apparent as the following description proceeds taken in connection with the accompanying drawings.

SUMMARY OF THE INVENTION

In accordance with the foregoing objects, the invention comprises a fishing pole holder which includes a pole handle receiving socket swingably mounted on a base or support. The socket is biased to a generally vertically upright position with respect to the base by an appropriate spring means such as a tension spring acting between the base and the socket. A latch mechanism holds the pole handle receiving socket in a generally horizontal position. The latch includes a release device operatively engaged with the fishing pole line and adapted to be released in response to a pull on the fishing line caused by a fish taking the bait. When this occurs, the latch is released and the pole is rapidly swung upwardly, thereby creating a tension or strike on the line to set the hook. The holder positions the pole in a generally upright position to maintain tension on the line and prevent escape of the fish.

DESCRIPTION OF THE DRAWINGS

FIG. 4 is a side elevation view of a holder of the type shown in FIG. 1 with the holder released;

FIG. 5 is a generally diagrammatic view of a fishing pole holder and fishing pole and line with the pole in position for fishing;

FIG. 6 is a view similar to FIG. 5 but showing the fishing pole holder immediately after the tug on the fishing line;

FIG. 7 is a view similar to FIG. 5 but showing the holder, pole and line in strike position while maintaining tension on the fishing line.

DESCRIPTION OF THE INVENTION

Figure 1:
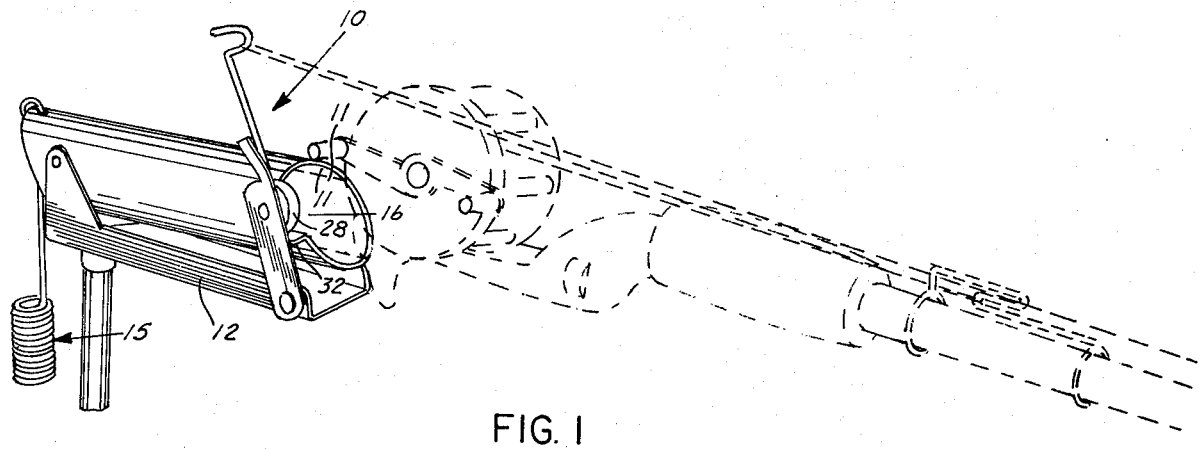
FIG. 1 is an isometric view of the fishing pole holder embodying the present invention and showing a pole and line in place.
Figure 2:
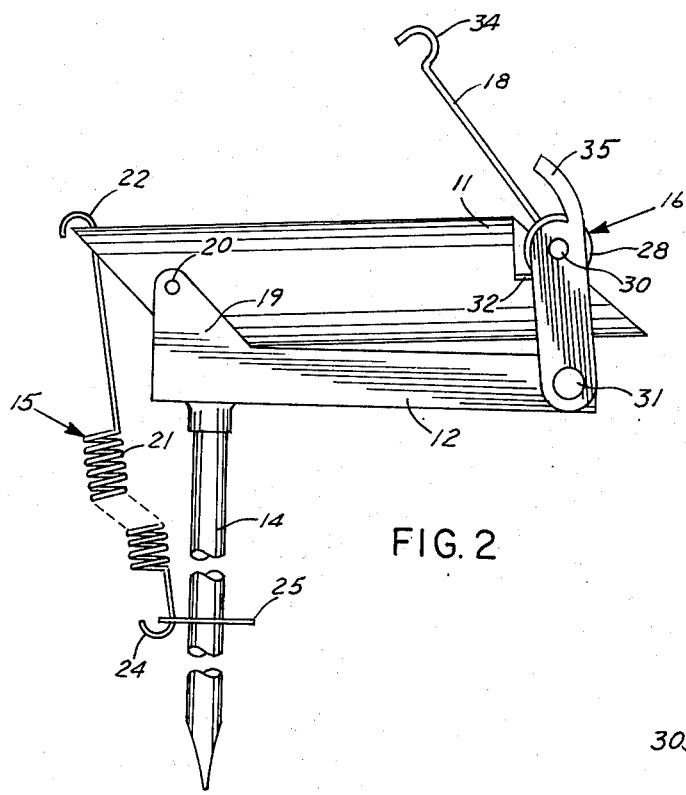
FIG. 2 is a side elevation view of the fishing pole holder shown in FIG. 1, somewhat enlarged, with the holder mechanism latched in position for supporting a pole.
Figure 3:
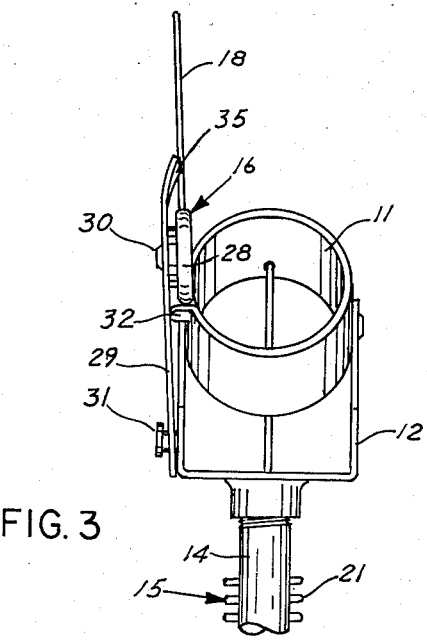
FIG. 3 is an end elevation view of the holder shown in FIG. 2.

In accordance with the present invention there is provided a fishing pole holder or pole tender which can be made in several sizes to accommodate a range of fishing equipment from the lightest pole to the heaviest. The tender or holder is designed for ice fishing or bait fishing from the shore of a lake or stream and may be utilized for supporting a single pole, and finds particular utility in areas where fishing with a number of poles is permitted. The holder or tender supports the pole after casting the line into the water. The holder includes an actuating mechanism engagable by the fishing line so that when a fish bites on the bait the slight tug releases the holder and causes it to swing the pole upwardly to set the hook and maintain tension on the line. This signals a bite, and at the same time insures that the hook is set. The fisherman observing the action of the holder and pole can then take the pole and reel in his catch.

For supporting the fishing pole, the fishing pole holder or tender 10 includes a socket tube 11 into which the handle of the fishing pole is inserted. The socket tube is pivotally mounted at one end on a support bracket or base 12 which is, in turn, mounted on a ground support spike 14 or other suitable mounting support means. The pole socket 11 is biased towards a generally vertically upright position by a spring mechanism 15 and is latched in a generally horizontal position against the biasing force of the spring 15 by a fishing line actuated latch mechanism 16. When the pole handle is inserted into the socket tube 11, the tube is positioned generally horizontally against the tension of the spring 15 and latched into place by the latch 16. The fishing line is looped around a line actuated release arm 18 with the bait in the water being fished. Upon a tug on the line, the latch 16 is released, and the spring 15 swings the socket tube upwardly which, carrying with it the fishing pole, pulls on the line and sets the hook into the fish.

The pole handle socket 11 is constituted of a generally tubular sleeve, the ends of which in the embodiment shown in the drawing are cut at an angle with respect to the longitudinally axis of the sleeve. This angle facilitates insertion of the pole handle into the tube and additionally provides a projecting portion for engagement with the lifting spring as will be described. The socket tube is pivotally mounted on the base 12, the latter being generally channel shaped in configuration and defining a pair of spaced upstanding ears 19 supporting a pivot pin 20 extending therebetween and pivotally mounting the socket tube 11. The lifting spring in the embodiment shown comprises a coil spring 21 one end of which 22 is secured to the projecting end of the socket tube, and the other end 24 is engaged with a canted washer 25 slideably mounted on the ground support spike 14. The opening in the washer 25 is only slightly larger than the support spike so that the washer bites into the spike when canted, but can be positioned up or down on the support spike to adjust the tension of the spring 21. The ground support spike 14 is threadably engaged with the base 12 and may be removed or replaced by another type of bracket, such as a bracket for mounting the pole holder on the side of a boat. Alternatively, instead of a tension spring 21 a coil spring means may be mounted on the pivot pin 20 and engaged between the base 12 and the socket tube 11 to bias the latter into a generally upright position with respect to the base. Other spring biasing means, such as a leaf spring, acting between the socket tube 11 and the base 12 may be utilized to advantage.

For latching the socket tube into a generally horizontal position, the latch mechanism 16 includes a latch roller or wheel 28 mounted on one end of a link 29 by a pivot pin 30, the link 29 being in turn pivotally mounted on the base 12 by a pivot pin 31. The socket tube is held in a generally horizontal position against the tension of the spring means 15 by the engagement of the latch roller wheel 28 with a latch shelf or ledge 32 integrally formed on the handle receiving end of the socket tube. The line engaging release means 18 extends from the latch roller 28 and is provided with a line engaging hook portion or eye 34 through which the fishing line extends. By pulling on the line and hence the eye 34, the latch release means 18 turns or pulls on the roller 28 and pulls it off of the shelf or ledge 32, thereby releasing the socket which is then free to swing upwardly about the pivot 20 under the actuating tension of the spring 15. Where additional pulling force on the line is desired, the link 29 is provided with a secondary latch finger 35 which may be hooked around the line actuated latch release means 18 to prevent rotation of the latch roller 28. To release the latch roller from the engaged ledge 32, the roller must slide off of the ledge 32 rather than roll, hence a greater pulling force is required. As a further modification, the secondary latch finger 35 may itself be engaged with the ledge 32, thereby providing an additional line tension adjustment position in which less pull on the line is required to actuate the mechanism.

The operation of the pole holder or tender is demonstrated in FIGS. 5, 6 and 7. Initially the pole holder is placed in the ground or mounted on a suitable support. The pole holder is set or cocked, and the socket tube latched into position. The fisherman then casts the baited hook into the area to be fished and inserts the pole handle into the socket tube 11. A section of the fishing line is then looped around the hook or eye 34 of the latch release arm 18, and any excess tension is taken up by the fishing pole reel, being careful not to release the latch mechanism 16. If necessary, a wire bracket 36 may be mounted on the fishing pole to assist in forming a loop in the fishing line.

When the fish bites on the bait, a slight tug on the line swings the latch release means 18 to release the latch 16 and the socket swings upwardly carrying the pole with it. This exerts a pull or "strike" on the line to set the hook in the fish. It will be appreciated that the upward movement moves the tip of the pole a substantial distance thereby pulling on the fishing line and effectively setting the hook into the fish; however, the flexibility of the pole tip will prevent the line from breaking or from pulling the hook completely out of the fish's mouth. In the upright position, the holder, together with the pole and its flexible tip, will hold the line taut preventing escape of the fish until the fisherman has an opportunity to reel in his catch.

In order to insure that the pole be held in an upright position and to maintain tension on the line in response to a pull of a fish, when the latch 16 has been released by a tug on the line the socket 11 swings upwardly under the pull of the spring 15. In its full upright position the pull on the spring is relaxed allowing the canted washer 25 to slide dowardly on the ground support spike, thereby effectively locking the pole handle socket 11 in its upright position against the tension of the spring 15. This insures that the pole will be held upright to maintain tension on the fishing line to avoid loss of the fish.

While a certain illustrative embodiment of the present invention has been shown in the drawings and described above in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

I claim as follows:

1. A fishing pole tender for automatically and upwardly lifting a fishing pole in response to a tug on the fishing line on said pole comprising in combination:

a longitudinal cylindrical tube having a socket formed therein at the foward end thereof for slideably receiving the handle of said fishing pole, said tube having opposing ends cut in rearwardly and upwardly sloping parallel angles so that the first end nearest said fishing pole defines a bottom forwardly extending portion and the second opposing end defines a top rearwardly extending portion;

a base of generally upwardly directed channel-shaped configuration for supporting said tube, said base defining a pair of spaced upstanding ears near said second end pivotally supporting said tube intermediate its ends;

a ground support spike secured to and extending downwardly from said base, said spike being attached to said base at a point adjacent to and slightly forward of the point of said pivotal connection;

a canted washer slideably mounted on said spike, said washer having a hole formed therein on one edge;

a coil spring for biasing said tube for upward swinging movement about said pivotal connection and having upper and lower inwardly directed hooks at opposing ends, said lower hook engaging said hole formed in said washer, and said upper hook engaging a hole formed in the top rearwardly extending portion of said tube;

a ledge integral with said tube and having a narrow planar surface adjacent the forardly extending portion thereof and in a plane corresponding with the longitudinal axis of said tube;

a latch engageable with said ledge for holding said tube in generally parallel relationship with said base in opposition to the bias of said spring thereon, said latch comprising a rearwardly opening semi-circular hook and a downwardly extending shaft integral with the bottom end of said hook, a roller operatively engageable with said ledge and supporting said shaft in a radially extending position from a point on the outer circular surface of said roller, said roller rolling off said ledge in response to a tug on said line engaging hook;

a link pivotally mounted at one end to the center of said roller and pivotally mounted at its other end to the forward channel end of said base for swingably supporting said roller and said hook on said base, and a rearwardly and upwardly directed arcuate finger integral with said one end of said link for selective latching engagement with said hook shaft; said roller sliding off said ledge in response to said tug when said finger engages said shaft; and said latch being releasable in response to a tug on the fishing line engaged with said hook whereupon said spring swings said tube upwardly to lift the fishing pole carried thereby.

* * * * *